United States Patent
Pustilnik et al.

(10) Patent No.: US 6,261,529 B1
(45) Date of Patent: Jul. 17, 2001

(54) PROCESS OF MAKING ALKALI METAL TETRATHIOCARBONATES

(75) Inventors: Anatoly Pustilnik; Michael Hojjatie, both of Tucson, AZ (US)

(73) Assignee: Tessenderlo Kerley, Inc., Phoenix, AZ (US)

(*) Notice: Subject to any disclaimer, the term of this patent is extended or adjusted under 35 U.S.C. 154(b) by 0 days.

(21) Appl. No.: 09/429,330

(22) Filed: Oct. 28, 1999

Related U.S. Application Data

(63) Continuation-in-part of application No. 09/366,349, filed on Aug. 2, 1999.

(51) Int. Cl.⁷ .................................................. C01B 31/26
(52) U.S. Cl. ............................................................ 423/414
(58) Field of Search ............................................. 423/414

(56) References Cited

U.S. PATENT DOCUMENTS

| | | |
|---|---|---|
| 3,607,844 | 9/1971 | Taylor . |
| 4,476,113 | 10/1984 | Young et al. . |
| 4,726,144 | 2/1988 | Young et al. . |
| 5,013,350 | 5/1991 | Green et al. . |
| 5,022,912 | 6/1991 | Young et al. . |
| 5,041,240 | 8/1991 | Green, II et al. . |
| 5,165,920 | 11/1992 | Green, II et al. . |
| 5,167,966 | 12/1992 | Green, II et al. . |
| 5,256,424 | 10/1993 | Green, II et al. . |
| 5,340,593 | 8/1994 | Green, II et al. . |
| 5,342,629 | 8/1994 | Brown et al. . |
| 5,360,782 | 11/1994 | Young et al. . |
| 5,397,557 | 3/1995 | Hatter et al. . |
| 5,614,476 * | 3/1997 | Young ................................ 507/239 |

FOREIGN PATENT DOCUMENTS

WO 96/11165  4/1996  (WO) .

* cited by examiner

Primary Examiner—Stuart L. Hendrickson
(74) Attorney, Agent, or Firm—Banner & Witcoff, Ltd.

(57) ABSTRACT

Tetrathiocarbonate salt solutions are prepared by dissolving sulfur in carbon disulfide to form a sulfur solution. An alkali metal hydroxide solution and an alkali metal hydrosulfide are added to the sulfur solution to form the tetrathiocarbonate salt. The process yields tetrathiocarbonate salts in substantially higher weight ratios with respect to trithiocarbonate salts. Aqueous solutions of tetrathiocarbonate salts can be produced in substantially higher concentrations, even approaching saturation. The process also enables tetrathiocarbonate salts to be produced at or near atmospheric pressure and at only slightly elevated temperatures.

16 Claims, No Drawings

PROCESS OF MAKING ALKALI METAL TETRATHIOCARBONATES

CROSS REFERENCE TO RELATED APPLICATION

This application is a continuation-in-part of Application Ser. No. 09/366,349, filed Aug. 2, 1999, the disclosure of which is incorporated by reference herein.

FIELD OF THE INVENTION

The present invention is directed to nematocides, fungicides, and insecticides, and, more particularly, to a method of producing alkali metal tetrathiocarbonates.

BACKGROUND OF THE INVENTION

Nematodes are among the more economically-damaging plant parasites. At least 150 of as many as 10,000 species of nematodes are known to adversely effect plant life. Nematode feeding causes hypertrophy or gall formation on the infested plant. Evidence of heavy infestation includes plant stunting, pale foliage, wilting, and even plant death in extreme cases. Virtually all crops and ornamental plants can be attacked by parasitic nematodes.

Particularly destructive nematode species include the root knot nematodes which are hosted by tomatoes, alfalfa, cotton, corn, potatoes, citrus and many other crops; the golden nematode of potatoes; the sugar beet cyst nematode; and the citrus nematode. These and other species are described in "The Soil Pest Complex," Agricultural and Food Chemistry, Vol. 3, pages 202–205 (1955). This article also describes another complication resulting from nematode infestation, namely, lowered resistance to the effects of plant attack by bacteria and pathogenic soil fungi.

Only soil sterilization, which is practical only for small amounts of soil, is effective at completely eliminating nematodes. Previous attempts to limit parasite populations to agriculturally acceptable levels include soil fumigation, crop rotation using non-hosting plant varieties, and (to a much lesser extent) the development of plants which are resistant to infestation. In many instances, adequate control of nematode populations is achieved only by combinations of these techniques. Most parasite control programs directed to nematodes have proven quite costly.

Another serious problem in agriculture is the attack on plants by pathogenic microorganisms, particularly fungi. Such pathogens typically have been controlled by fumigating target plants with biocides prior to crop planting. Many of these biocides are no longer regarded as environmentally safe. Currently available fungicides are very expensive and lose effectiveness against successive generations of fungi due to rapid genetic adaptability of the fungi.

Carbon disulfide has been used as a soil fumigant as early as the 1870's to control the sugar beet nematode. Carbon disulfide also has proven effective as an insecticide, as a rodenticide, and for controlling certain weeds. Carbon disulfide is commercially impractical, however, because very large quantities must be applied due to its high volatility. Other drawbacks include its high flammability, objectionable odor, and toxicity to humans. When sold for fumigant use, carbon disulfide normally is mixed with fire retardants, such as carbon tetrachloride. Typically, such fumigant compositions contain no more than about 20 wt % carbon disulfide.

Numerous compositions have been developed which exhibit nematocidal properties. Active ingredients in such compositions include the polyamines described in U.S. Pat. No. 2,979,434 to Santmyer, the heterocyclic compounds described in U.S. Pat. No. 2,086,907 to Hessel, and various halogenated compounds such as 1,2-dibromoethane, methyl bromide, 3-bromo-propyne, 1,2-dichloropropane, and ethylene dichloride. Each compound suffers from drawbacks which greatly limit its commercial acceptability. For example, halogenated compounds are quite phototoxic, restricting their utility primarily to pre-planting treatments. In addition, halogenated compounds such as methyl bromide are quite expensive and have an adverse impact on stratospheric ozone. Methyl bromide applications on vineyards also may be ineffective in controlling vineyard soil pests due to the compound's inability to deeply penetrate heavy, coarse, or poorly prepared soils, as reported in USEPA, 430-R-96-021, 10 case studies, vol. 2, 1996.

Another class of compositions which have proven useful for controlling nematodes is thiocarbonates. U.S. Pat. No. 2,676,129 to Bashour describes the preparation of lower aliphatic disubstituted trithiocarbonates of the formula:

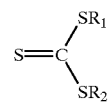

wherein $R_1$ and $R_2$ are alkyl radicals having from three to nine carbon atoms. Bashour describes dissolving the trithiocarbonate compounds in acetone for treating nematode-infested soils.

The use of sodium- and potassium thiocarbonates as effective nematode control agents is described in U.S. Pat. Nos. 2,836,532 and 2,836,533 to Seifter. The '532 patent relates to the use of sodium- and potassium trithiocarbonate. The '533 patent discloses alkali metal and ammonium salts of tetrathioperoxycarbonic acid.

One tetrathiocarbonate-based product, known commercially as ENZONE®, is available from Entek Corporation, 1912 E. Lemon Heights Drive, Santa Ana, Calif. 92705, tel. (714) 731–5581. The active ingredient in ENZONE® is sodium tetrathiocarbonate. Sodium tetrathiocarbonate has received United States Environmental Protection Agency (USEPA) registration for grapes and citrus. Sodium tetrathiocarbonate's application to many other crops for controlling soil-borne diseases and pests also is being investigated. Sodium tetrathiocarbonate can be applied pre- or post-planting on vines and citrus. Sodium tetrathiocarbonate stoichiometrically degrades to carbon disulfide, sodium hydroxide, hydrogen sulfide, and sulfur in the soil.

The chemistry of thiocarbonic acids and their salts has been studied in some detail (O'Donoghue et al., J. Chem. Soc., 89(II), 1812, 1906; Yeoman, J. Chem. Soc., 119, 34, 192 1; Mills et al., J. Chem. Soc., 128(11), 2326, 1928; and Stone et al., U.S. Pat. No. 2,893,835). O'Donoghue et al. discloses preparing ammonium thiocarbonate by reacting liquid ammonia with cold alcoholic thiocarbonic acid. Thiocarbonic acid is said to be prepared by dropping a solution of calcium thiocarbonate into concentrated hydrochloric acid. The calcium thiocarbonate is described by the authors as a double salt, including the calcium cation in combination with both hydroxide and trithiocarbonate anions.

Yeoman describes the preparation of trithiocarbonates and tetrathiocarbonates (perthiocarbonates). Ammonium trithiocarbonate is said to be prepared by saturating an alcoholic ammonia solution with hydrogen sulfide, followed by adding carbon disulfide, and then adding dry ether to precipitate the salt product. Ammonium tetrathiocarbonate is said to be prepared in a similar manner, except that after reacting the ammonia and hydrogen sulfide, elemental sulfur is added to form the disulfide, $(NH_4)_2S_2$, and carbon disulfide is added thereafter to form and immediately precipitate the desired tetrathiocarbonate product.

The works by O'Donoghue et al. and Mills et al., as well as the work by Yeoman, describe the instability of the salts of thiocarbonic acid. Yeoman observes that both ammonium trithiocarbonate and ammonium tetrathiocarbonate solutions are very unstable due to the decomposition of the salts into thiocyanate, as well as complete dissociation into ammonia, hydrogen sulfide, and carbon disulfide.

Yeoman further teaches that aqueous solutions of sodium trithiocarbonate and sodium tetrathiocarbonate remain stable only if oxygen and carbon dioxide are "rigidly excluded." The presence of oxygen is said to cause decomposition of the trithiocarbonate salts to carbon disulfide and thiosulfates, whereas carbon dioxide is said to decompose the trithiocarbonate salts to carbonate and carbon disulfide. Similarly, solutions of sodium tetrathiocarbonate are said to remain stable for a considerable time in the absence of oxygen and carbon dioxide. Oxygen is said to cause decomposition into thiosulfate and carbon disulfide. Carbon dioxide is said to decompose sodium tetrathiocarbonate to carbonate, elemental sulfur, carbon disulfide, and hydrogen sulfide. Potassium thiocarbonates are said to behave similarly.

Numerous efforts have been made to increase the stability of thiocarbonate salt solutions. Stone et al. describes the use of aprotic solvents such as hexane, cyclohexane, and benzene, or protic solvents such as ethanol, isopropanol, or dioxane to increase the stability of thiocarbonic acid salts.

Pilling et al., U.S. Pat. No. 5,039,327 discloses stabilized solid particles of one or more salts, thioesters, or complexes of trithiocarbonates in absolute ethanol. The solid particles are formed in a substantially water-free environment in which the thiocarbonate is said to be stable and substantially insoluble. The particles then are placed in an environment which is substantially free of water, $CO_2$, and $O_2$, and are encapsulated with a coating to protect them from future contact with air and water.

Pilling et al. describes the water-free environment in which the stabilized solids are prepared as one in which the water content is below the amount which would cause observable decomposition or hydrolysis of an unprotected thiocarbonate which is dissolved or suspended therein or which results in the formation and separation of an aqueous solution of the solids.

One process of preparing salts of tetrathiocarbonic acids is set forth in PCT/US96/11165. Salts of tetrathiocarbonic acids are said to be produced in a batch process in which a hydroxide, hydrogen sulfide, sulfur, and carbon disulfide are reacted sequentially to produce an aqueous solution of tetrathiocarbonate salts.

Several drawbacks exist with the batch process described in PCT/US96/11165. For example, the concentration of sodium tetrathiocarbonate produced typically is limited to about 32 wt %, mostly due to the low solubility of intermediate compound sodium sulfide. Conducting the reactions in the non-aqueous phase is said to unacceptably increase reaction time.

Another drawback is that extensive heat is generated during the exothermic reaction of hydroxide with hydrogen sulfide or its alkali metal salts. An efficient cooling system or a waiting period is necessary to avoid evaporation of the subsequently-added carbon disulfide. Alternately, a high pressure device must be used to keep the carbon disulfide in liquid form.

Yet another problem with the PCT '165 process is the formation of up to about 50 wt % trithiocarbonate salts. Trithiocarbonate salts are kinetically more stable than tetrathiocarbonate salts. The presence of trithiocarbonate reduces the effectiveness of tetrathiocarbonate as a time-controlled pesticide, nematocide, and fungicide.

Co-pending application Ser. No. 09/366,349 describes a process for preparing aqueous solutions of tetrathiocarbonate salts in high concentrations and in higher weight ratios with respect to trithiocarbonates. The '349 process comprises initially dissolving sulfur in carbon disulfide to form a sulfur solution. An alkali metal hydroxide solution is added to the sulfur solution, and an emulsion is formed. An alkali metal hydrosulfide is added to the emulsion under conditions sufficient to form the tetrathiocarbonate salt solution. While the process represents significant improvements over the prior art, it has been found that up to about 20 wt % of thiosulfates can be formed if the alkali metal hydrosulfide is added too rapidly or if temperature is not controlled. Thiosulfates undesirably reduce the quality of the end product and the yield of the desired tetrathiocarbonate salt.

It thus would be desirable to develop a manufacturing process for tetrathiocarbonate salts that provides aqueous solutions of tetrathiocarbonate salts in higher concentrations than now produced by prior art processes. It also would be desirable to develop a process that produces tetrathiocarbonates in higher weight ratios with respect to trithiocarbonates, and which avoids high pressures and minimizes the formation of hydrogen sulfide gas and undesirable solids, especially carbonates and thiosulfates. It also would be advantageous to produce tetrathiocarbonate salts at only slightly elevated temperatures and under atmospheric pressure to minimize the time and cost required for their preparation.

SUMMARY OF THE INVENTION

The present invention is directed to a process of producing aqueous tetrathiocarbonate salt solutions which overcomes many of the drawbacks of prior art processes. Tetrathiocarbonate salts can be produced at substantially higher weight ratios with respect to trithiocarbonate salts. In addition, aqueous solutions of tetrathiocarbonate salts can be produced in substantially higher concentrations. The process of the present invention produces tetrathiocarbonate salts in higher purities, in solutions having higher concentrations, and at lower costs, compared to presently available processes.

The process of the present invention comprises initially dissolving sulfur in carbon disulfide to form a sulfur solution. An alkali metal hydroxide solution and an alkali metal hydrosulfide are added to the sulfur solution under conditions sufficient to form the tetrathiocarbonate salt solution. According to a preferred embodiment of the invention, the alkali metal hydroxide and the alkali metal hydrosulfide are added simultaneously to the sulfur solution.

By initially dissolving sulfur in carbon disulfide and thereafter reacting with the alkali metal hydroxide and the alkali metal hydrosulfide, formation of significant amounts of hydrogen sulfide is avoided. The present invention therefore eliminates the significant heat release resulting from the exothermic reaction between the alkali metal hydroxide and hydrogen sulfide. Because the dissolution of sulfur in carbon disulfide is an endothermic reaction, less extensive external cooling is required to maintain the desired reaction temperature. The moderate temperatures and low pressures of the present invention advantageously reduce overall reaction time and cost. Total processing time can be further reduced by simultaneously adding the alkali metal hydroxide and alkali metal hydrosulfide. Simultaneous addition of these reactants also has been found to avoid or substantially reduce undesired thiosulfate formation.

Another advantage obtained by the process of the present invention is that formation of low-solubility compounds, especially sodium sulfide, is substantially avoided. Because formation of low-solubility compounds is essentially eliminated, aqueous solutions of tetrathiocarbonate salts advantageously can be produced in significantly higher concentrations.

An important aspect of the invention is controlling the reaction temperature. The weight ratio of tetrathiocarbonate salts to trithiocarbonate salts produced ($R_{4/3}$), as well as the amount of thiosulfates formed, is strongly dependent on the reaction temperature. It has been found that the weight ratio of tetrathiocarbonate salts to trithiocarbonate salts formed is maximized at reaction temperatures from about 20° C. to about 40° C., especially from about 35° C. to about 38° C. It also has been found that formation of thiosulfates can be avoided or substantially reduced by employing reaction temperatures less than about 30° C.

DETAILED DESCRIPTION OF THE INVENTION

The present invention is directed to a process of making an aqueous alkali metal tetrathiocarbonate solution. In accordance with the method, sulfur is dissolved in liquid carbon disulfide to form a sulfur solution. An alkali metal hydroxide solution and an alkali metal hydrosulfide are added to the sulfur solution under conditions sufficient to form the alkali metal tetrathiocarbonate salt. The alkali metal hydroxide solution and alkali metal hydrosulfide can be added to the sulfur solution either sequentially or simultaneously.

By initially dissolving sulfur in carbon disulfide and thereafter reacting with the alkali metal hydroxide, formation of large amounts of hydrogen sulfide is avoided. The present invention therefore eliminates the significant heat release resulting from the exothermic reaction between the alkali metal hydroxide and hydrogen sulfide. Because the dissolution of sulfur in carbon disulfide is endothermic, less extensive cooling is required to maintain the reaction mass at the desired temperature. By reducing exothermic heating of the reaction mass, the problems associated with carbon disulfide boiling are eliminated, and the reaction can proceed at or near atmospheric pressure. As will be appreciated by those skilled in the art, lower reaction pressures and reduced heat evolution during reaction advantageously reduce cost and overall time required for the reaction.

Dissolving sulfur in carbon disulfide prior to adding the alkali metal hydroxide also substantially reduces formation of intermediate compounds having low solubility, such as alkali metal sulfides. The reduced formation of low-soluble intermediate compounds enables the process to produce aqueous solutions of tetrathiocarbonate salts in substantially higher concentrations, approaching saturation, i.e., about 56 wt %.

Aqueous solutions of alkali metal tetrathiocarbonates ($M_2CS_4$) are prepared by initially dissolving sulfur (S) in liquid carbon disulfide ($CS_2$) to form a sulfur solution. Powdered sulfur, molten sulfur, or mixtures thereof can be used. Carbon disulfide is a good solvent for dissolving sulfur (23 g S/100 cc $CS_2$ at 0° C.). For the amounts of sulfur and carbon disulfide used in the process of the present invention, molten sulfur will completely dissolve in carbon disulfide, and about 99 wt % of powdered sulfur will dissolve in carbon disulfide. When molten sulfur is used, a nitrogen blanket preferably is employed to prevent flashing of the carbon disulfide.

An alkali metal hydroxide (MOH) solution, such as sodium hydroxide (NaOH) or potassium hydroxide (KOH), is added to the sulfur solution. Preferably, an aqueous solution of alkali metal hydroxide is used. The concentration of the aqueous solution of alkali metal hydroxide preferably exceeds about 20 wt %, more preferably is from about 30 wt % to about 55 wt %, and even more preferably is from about 46 wt % to about 52 wt %. Skilled practitioners recognize that a hydroxide concentration less than 30 wt % enables alkali metal hydroxide to react with carbon disulfide to yield alkali metal trithiocarbonate and carbonate as by-products. Reaction between the alkali metal hydroxide and carbon disulfide readily occurs when dilute (e.g., less than 20 wt %) aqueous alkali metal hydroxide solutions are used, with the propensity of the reaction increasing with decreasing hydroxide concentrations.

Carbonates are especially undesirable because they are not active ingredients in the end product, reduce yield of the desired tetrathiocarbonate salt, and can cause undesirable solid formation. During the reaction, a portion of trithiocarbonates formed convert to the desired tetrathiocarbonates. During use of the end product, trithiocarbonates also can be degraded to $CS_2$, an active nematocide, fungicide, and insecticide. However, degradation of trithiocarbonates to $CS_2$ occurs significantly more slowly than degradation of tetrathiocarbonates to $CS_2$.

An alkali metal hydrosulfide (MSH) also is added to the sulfur solution. The alkali metal hydrosulfide can be added subsequent to adding the alkali metal hydroxide, but preferably is added simultaneously with the alkali metal hydroxide. The alkali metal hydrosulfide preferably is provided as an aqueous solution, typically in a concentration from about 5 wt % to about 60 wt %, preferably from about 25 wt % to about 50 wt %, and more preferably from about 40 wt % to about 45 wt %. Examples of preferred alkali metal hydrosulfides are sodium hydrosulfide (NaSH) and potassium hydrosulfide (KSH), each in aqueous solution.

The alkali metal hydroxide forms a two-phase system with the sulfur solution, with the less dense sulfur solution forming the top phase and the alkali metal hydroxide solution forming the bottom phase. The alkali metal hydrosulfide reacts at the phase interface with sulfur and alkali metal hydroxide to form alkali metal disulfide ($M_2S_2$) in the aqueous (bottom) phase. The intermediate alkali metal disulfide thus-produced reacts with carbon disulfide at the interface of the two phases to form the desired alkali metal tetrathiocarbonate ($M_2CS_4$). The alkali metal hydrosulfide also can react with carbon disulfide to produce undesirable trithiocarbonate and carbonate by-products, as well as hydrogen sulfide gas. This undesirable side reaction can be minimized by optimizing the concentration of the alkali metal hydrosulfide solution and the reaction temperature.

Another by-product which may be formed is alkali metal thiosulfate ($M_2S_2O_3$). Thiosulfates are undesirable in the end product because they do not have pesticide properties and reduce the quality and yield of the desired tetrathiocarbonate salt. Thiosulfate formation can be increased by the heat (exotherm) resulting from alkali metal hydrosulfide addition. Large amounts (e.g., up to 15 or 20 wt %) of thiosulfates can be formed if the temperature is not controlled during reaction. In particular, adding the alkali metal hydrosulfide too rapidly greatly increases the risk of an uncontrolled temperature excursion resulting from a large exotherm. It has been found that controlling the reaction temperature so as not to exceed about 30° C. is an effective means for avoiding or substantially reducing thiosulfate formation.

Another way to avoid or substantially reduce thiosulfate formation is by adding the alkali metal hydroxide and the alkali metal hydrosulfide simultaneously. This approach results in the generation of less heat and a shorter reaction time. Because contact between the alkali metal hydroxide and the carbon disulfide/sulfur solution is substantially reduced, thiosulfate formation is avoided or substantially reduced, even if the reaction temperature exceeds 30° C.

By preparing a solution of carbon disulfide and sulfur prior to adding alkali metal hydroxide and alkali metal hydrosulfide, either sequentially or simultaneously, significant amounts of carbon disulfide advantageously are converted to alkali metal tetrathiocarbonate without generating appreciable amounts of hydrogen sulfide and trithiocarbonate.

An important aspect of the invention is controlling the temperature at which the reaction proceeds so as to provide most favorable reaction conditions. The ratio of tetrathiocarbonate salts to trithiocarbonate salts produced ($R_{4/3}$) is dependent on reaction temperature. By maintaining the reaction temperature within specific ranges and carbon disulfide as the limiting reagent, tetrathiocarbonate salts can be produced in weight ratios up to about 9:1 with respect to trithiocarbonate salts, and in aqueous solution with concentrations near saturation, i.e., about 56 wt %. The stoichiometry of the overall reaction is $CS_2+S+MOH+MSH \rightarrow M_2CS_4+H_2O$.

The entire reaction preferably proceeds at a temperature from about 20° C. to about 50° C. and more preferably from about 25° C. to about 40° C. When alkali metal hydroxide and alkali metal hydrosulfide are added sequentially, the reaction temperature preferably is from about 25° C. to about 30° C. to avoid significant thiosulfate formation as previously described. When alkali metal hydroxide and alkali metal hydrosulfide are added simultaneously, the reaction temperature preferably is from about 35° C. to about 38° C. The reaction mixture may be cooled (and heated if necessary) by any suitable heat exchange means which are well-known to those skilled in the art.

Table 1 illustrates the effect temperature has on the ratio of tetrathiocarbonate to trithiocarbonate formed. At a reaction temperature of 25° C., the weight ratio of tetrathiocarbonate to trithiocarbonate ($R_{4/3}$) is about 1. At reaction temperatures of 35° C. to 38° C., $R_{4/3}$ is about 4. At a reaction temperature of 40° C., $R_{4/3}$ drops to about 3.4.

TABLE 1

Product Composition as a Function of Reaction Temperature

| Temp, ° C. | $Na_2CS_4$ (wt %) | $Na_2CS_3$ (wt %) | $CS_2$ (wt %) | $R_{4/3}$ |
|---|---|---|---|---|
| 25 | 23 | 23.7 | 21.1 | 1 |
| 25 | 30.2 | 18.9 | 21.7 | 1.6 |
| 30 | 30.7 | 18.5 | 21.7 | 1.7 |
| 30 | 25.7 | 22.2 | 21.5 | 1.2 |
| 31 | 27.4 | 20.8 | 21.8 | 1.3 |
| 35 | 40 | 11 | 21.9 | 3.6 |
| 35 | 41.4 | 9.8 | 21.5 | 4.2 |
| 35 | 40.4 | 10.9 | 21.9 | 3.7 |
| 38 | 41.7 | 9.7 | 21.8 | 4.3 |
| 40 | 38.3 | 11.4 | 21.3 | 3.4 |

EXAMPLES

The following examples are illustrative of preferred aspects of the invention and are not intended to limit the scope of the invention.

Example 1

Concentrated sodium tetrathiocarbonate was prepared using 53 wt % aqueous NaOH and 40.2 wt % NaSH (total alkalinity=31.4%). The NaOH solution was prepared by dissolving NaOH pellets in 50 wt % aqueous caustic. The molar ratio of reagents ($CS_2$:NaOH:NaSH:S) was 1:1.16:1.14:1.09.

Carbon disulfide was charged into a round-bottom flask equipped with a mechanical stirrer, thermometer, and a water condenser. Powdered sulfur was added to the carbon disulfide to form a sulfur solution. The aqueous NaOH and NaSH solutions were simultaneously added to the flask, with NaOH in slight anticipation of NaSH in order to maintain high pH. Temperature of aqueous NaOH was maintained at 37–40° C. to keep the reagent from crystallizing. Temperature of the synthesis was maintained at 33–37° C. The synthesis was continued for about 1.5 hours. The product was analyzed and found to contain about 0.3 wt % sodium thiosulfate and 22.1 wt % $CS_2$ or 54 wt % sodium tetrathiocarbonate.

Example 2

Concentrated sodium tetrathiocarbonate was prepared using 50 wt % aqueous NaOH and 44 wt % NaSH (total alkalinity ~31.4%). The molar ratio of reagents ($CS_2$:NaOH:NaSH:S) was 1:1.19:1.14:1.06.

Carbon disulfide was charged into a round-bottom flask equipped with a mechanical stirrer, thermometer, and a water condenser. Powdered sulfur was added to the carbon disulfide to form a sulfur solution. The aqueous NaOH and NaSH solutions were simultaneously added to the flask, with NaOH being slightly ahead of NaSH in order to maintain high pH. The product was analyzed and found to contain 1.6 wt % sodium thiosulfate and 22.1 wt % $CS_2$ or 54 wt % sodium tetrathiocarbonate.

It will be apparent to those skilled in the art that various modifications and variations can be made in the compositions and methods of the present invention without departing from the spirit or scope of the invention. Thus, it is intended that the present invention cover the modifications and variations of this invention provided they come within the scope of the appended claims and their equivalents.

What is claimed is:

1. A process of preparing a tetrathiocarbonate salt solution comprising:
   dissolving sulfur in carbon disulfide to form a sulfur solution;
   adding to said sulfur solution an alkali metal hydroxide solution and an alkali metal hydrosulfide under conditions sufficient to form said tetrathiocarbonate salt solution.

2. The process of claim 1 wherein said sulfur comprises molten sulfur, powdered sulfur, or mixtures thereof.

3. The process of claim 1 wherein said conditions include a reaction temperature of from about 20° C. to about 50° C.

4. The process of claim 3 wherein said temperature is from about 25° C. to about 40° C.

5. The process of claim 1 wherein said alkali metal hydroxide and said alkali metal hydrosulfide are simultaneously added to said sulfur solution.

6. The process of claim 1 wherein said alkali metal hydroxide solution comprises from about 46 wt % to about 52 wt % aqueous NaOH solution.

7. The process of claim 1 wherein said alkali metal hydrosulfide comprises from about 40 wt % to about 50 wt % aqueous NaSH solution.

8. A process of preparing a sodium tetrathiocarbonate solution comprising:

dissolving sulfur in carbon disulfide to form a sulfur solution;

adding to said sulfur solution an aqueous NaOH solution and an aqueous NASH solution under conditions sufficient to form said sodium tetrathiocarbonate solution.

9. The process of claim 8 wherein said sulfur comprises molten sulfur, powdered sulfur, or mixtures thereof.

10. The process of claim 8 wherein said conditions include a temperature of from about 20° C. to about 50° C.

11. The process of claim 10 wherein said temperature is from about 25° C. to about 40° C.

12. The process of claim 8 wherein said alkali metal hydroxide and said alkali metal hydrosulfide are simultaneously added to said sulfur solution.

13. A process of preparing an aqueous sodium tetrathiocarbonate solution comprising:

forming a sulfur solution by dissolving sulfur in carbon disulfide;

simultaneously adding to said sulfur solution 46 wt % to 52 wt % aqueous NaOH solution and 40 wt % to 50 wt % aqueous NaSH solution, while maintaining a temperature of from about 35° C. to about 38° C. to form said aqueous sodium tetrathiocarbonate solution.

14. The process of claim 13 wherein said sulfur comprises molten sulfur, powdered sulfur, or mixtures thereof.

15. The process of claim 13 wherein said aqueous solution of sodium tetrathiocarbonate has a concentration of at least about 40 wt %.

16. The process of claim 15 wherein said sodium tetrathiocarbonate concentration is at least about 50 wt %.

* * * * *

UNITED STATES PATENT AND TRADEMARK OFFICE
CERTIFICATE OF CORRECTION

PATENT NO. : 6,261,529 B1
DATED : July 17, 2001
INVENTOR(S) : Anatoly Pustilnik et al.

It is certified that error appears in the above-identified patent and that said Letters Patent is hereby corrected as shown below:

Column 9, claim 8,
Line 7, "NASH" has been replaced with -- NaSH --.

Signed and Sealed this

Twenty-ninth Day of January, 2002

Attest:

Attesting Officer

JAMES E. ROGAN
Director of the United States Patent and Trademark Office